(12) United States Patent
Uni et al.

(10) Patent No.: US 8,734,837 B2
(45) Date of Patent: *May 27, 2014

(54) ENHANCEMENT OF DEVELOPMENT OF OVIPAROUS SPECIES BY IN OVO FEEDING OF ENTERIC MODULATORS

(75) Inventors: Zehava Uni, Nes-Ziona (IL); Peter R. Ferket, Raleigh, NC (US)

(73) Assignees: North Carolina State University, Raleigh, NC (US); Yissum Research Development Company of the Hebrew University of Jerusalem, Jerusalem (IL)

(*) Notice: Subject to any disclaimer, the term of this patent is extended or adjusted under 35 U.S.C. 154(b) by 413 days.

This patent is subject to a terminal disclaimer.

(21) Appl. No.: 10/609,741

(22) Filed: Jun. 30, 2003

(65) Prior Publication Data

US 2004/0071753 A1    Apr. 15, 2004

Related U.S. Application Data

(63) Continuation-in-part of application No. 09/919,386, filed on Jul. 31, 2001, now Pat. No. 6,592,878.

(60) Provisional application No. 60/222,744, filed on Aug. 3, 2000.

(51) Int. Cl.
*A23K 1/18* (2006.01)
*A23K 1/165* (2006.01)

(52) U.S. Cl.
USPC ............ 424/442; 424/422; 424/423; 424/426; 426/2; 514/2; 514/23; 514/494; 514/554; 514/557; 514/561

(58) Field of Classification Search
None
See application file for complete search history.

(56) References Cited

U.S. PATENT DOCUMENTS

| | | | |
|---|---|---|---|
| 4,040,388 A | * | 8/1977 | Miller ........................ 119/6.8 |
| 4,458,630 A | | 7/1984 | Sharma et al. |
| 4,469,047 A | | 9/1984 | Miller |
| 4,593,646 A | | 6/1986 | Miller |
| 4,903,635 A | | 2/1990 | Hebrank |
| 4,992,470 A | * | 2/1991 | Nissen ........................ 514/578 |
| 5,028,421 A | | 7/1991 | Fredericksen et al. |
| 5,028,440 A | | 7/1991 | Nissen |
| 5,087,472 A | | 2/1992 | Nissen |

(Continued)

FOREIGN PATENT DOCUMENTS

| | | |
|---|---|---|
| EP | 0251750 | 11/1992 |
| EP | 1307230 | 10/2013 |
| IL | 154266 | 6/2010 |
| WO | WO 02/12436 | 2/2002 |

OTHER PUBLICATIONS

"Chicken Eggs", 1970, downloaded from the world wide web on Nov. 27, 2006.*

(Continued)

*Primary Examiner* — Neil Levy
(74) *Attorney, Agent, or Firm* — Jenkins, Wilson, Taylor & Hunt, P.A.

(57) ABSTRACT

The development and growth of oviparous species such as birds is enhanced by in ovo administration of an enteric modulator such as HMB. The enteric modulator is administered into the amnion, where it is then orally ingested by the subject. The enteric modulator enhances the enteric development of the subject prior to hatch, and enhances the growth of the animal before and after hatch.

3 Claims, 7 Drawing Sheets

(56) References Cited

U.S. PATENT DOCUMENTS

| | | | |
|---|---|---|---|
| 5,158,038 A | 10/1992 | Sheeks et al. | |
| 5,397,568 A | 3/1995 | Whitfill et al. | |
| 5,916,869 A * | 6/1999 | Croom et al. | 514/2 |
| 5,976,580 A | 11/1999 | Ivey et al. | |
| 6,153,246 A | 11/2000 | Gossart | |
| 6,244,214 B1 | 6/2001 | Hebrank | |
| 6,592,878 B2 | 7/2003 | Uni et al. | |
| 6,682,754 B2 * | 1/2004 | Emery et al. | 424/426 |
| 2001/0046500 A1 * | 11/2001 | Jongsma et al. | 424/204.1 |
| 2002/0035965 A1 | 3/2002 | Uni et al. | |

OTHER PUBLICATIONS

Dalloul et al. Immunopotentiating Effect of a Formitella fraxinea-Derived Lectin on Chicken Immunity and Resistance to Coccidiosis, Poultry Science, 2006.*

Elaroussi et al '93—in HCAPLUS #1993:471448—Survival of VIT.D Defiecent Embryos.*

Ohta et al '99—in HCAPLUS #1999:750605—Effect of Amino Acid Injection in Broiler Breeder Eggs.*

Zakaria et al '98—in HCAPLUS #1998:646811—Effect of Ascorbic Acid Treatment During Egg Incubation.*

Hsu et al '92—in DISSABS #93:46695—Glutathione,—Immune Resonses in Chickens.*

Eiduson '66 in HCAPLUS # 1966:501802—5-Hydroxytrytamine in the Developing Chick Brain.*

Walker '63. , 112,pp. 245-247 in Proceedings of the Society for Experimental Biology & Medicine—Abstract # 58:75195.*

Abstract, *Immunopharmacol Immunotoxicol*, (2), pp. 307-330, May 21, 1999.

Disclosure, *In ovo Feeding of Avian Embryos to Accelerate the Development of Gastrointestinal Tract and Elevate Hatchlings Weight*, U.S. Appl. No. 60/222,733 (Aug. 3, 2000).

Chinese Office Action corresponding to a Chinese patent Application No. 200480018721.X dated May 17, 2007.

Office communication corresponding to Chinese Patent Application No. 200480018721.X dated May 29, 2008.

Notice of Allowance corresponding to U.S. Appl. No. 09/919,386 dated Feb. 28, 2003.

Office Action corresponding to U.S. Appl. No. 09/919,386 dated Dec. 3, 2002.

Office communication corresponding to Israeli Patent Application No. 154266 dated May 20, 2008.

Foye et al., "Effect of In Ovo Feeding Egg White Protein, β-Hydroxy-β-Methylbutyrate, and Carbohydrates on Glycogen Status and Neonatal Growth of Turkeys," Poultry Science, vol. 85, pp. 1185-1192 (2006).

Foye et al., "The Effects of Amniotic Nutrient Administration, "In ovo Feeding" of Arginine and/or β-Hydroxy-β-Methyl Butyrate (HMB) on Insulin-like Growth Factors, Energy Metabolism and Growth in Turkey Poults," International Journal of Poultry Science, vol. 5, No. 4, pp. 309-317 (2006).

Foye et al., "The Effects of In Ovo Feeding Arginine, β-Hydroxy-62 -Methyl-Butyrate, and Protein on Jejunal Digestive and Absorptive Activity in Embryonic and Neonatal Turkey Poults, " Poultry Science, vol. 86, pp. 2343-2349 (2007).

Foye, "The biochemical and molecular effects of amnionic nutrient administration, "in ovo feeding" on intestinal development and function and carbohydrate metabolism in turkey embryos and poults," NCSU Libraries, Dissertation (2005).

Santos, "Impact of poultry age, season, litter quality, and nutritional intervention strategies on *Salmonella* prevalence and populations, serotypes, genotypes, and antibiotic resistance profiles," NCSU Library, Dissertation (2006).

Smirnov et al., "Mucin Gene Expression and Mucin Content in the Chicken Intestinal Goblet Cells Are Affected by In Ovo Feeding of Carbohydrates," Poultry Science, vol. 85, pp. 669-673 (2006).

Tako et al., "Changes in chicken intestinal zinc exporter mRNA expression and small intestinal functionality following intra-amniotic zinc-methionine administration," Journal of Nutritional Biochemistry, vol. 16, pp. 339-346 (2005).

Tako et al., "Effects of In Ovo Feeding of Carbohydrates and β-Hydroxy-β-Methylbutyrate on the Development of Chicken Intestine," Poultry Science, vol. 83, pp. 2023-2028 (2004).

Uni et al., "In Ovo Feeding Improves Energy Status of Late-Term Chicken Embryos," Poultry Science, vol. 84, pp. 764-770 (2005).

Uni et al., "Methods for early nutrition and their potential," World's Poultry Science Journal, vol. 60, pp. 103-113 (Mar. 2004).

Chinese Patent Office Examination Report corresponding to Chinese Patent Application No. 01813857.8 dated Jun. 27, 2008.

Decision of Granting Patent Right for Invention corresponding to Chinese Patent Application No. 01813857.8 dated Nov. 28, 2008.

Notice of Acceptance corresponding to Israeli Patent Application No. 154266 dated Apr. 2, 2009.

Certificate of Invention corresponding to Chinese Invention Patent No. ZL 01813857.8 issued Apr. 8, 2009.

Office Communication corresponding to Chinese Patent Application No. 200480018721.X dated Jul. 3, 2009.

Gore et al., "Enhancement of Humoral and Cellular Immunity by Vitamin E after Embryonic Exposure," Poultry Science, vol. 76, pp. 984-991 (1997).

International Search Report corresponding to International Application No. PCT/US01/24157 dated Jun. 24, 2002.

Office Action corresponding to U.S. Appl. No. 09/919,386 dated Jun. 5, 2002.

Official Action corresponding Chinese Patent Application No. 01813857.8 dated Sep. 21, 2004.

Peterson et al., Enhancement of Cellular and Humoral Immunity in Young Broilers by the Dietary Supplementation of Beta-Hydroxy-Beta-Methylbutyrate,: Immunopharmacol. Immunotoxicol., (2), pp. 307-330, May 21, 1999. (Abstract).

Office communication corresponding to European Patent Application 04 777 327.0—2313 dated Mar. 15, 2011.

Office communication corresponding to European Patent Application 01 957 376.5—2313 dated Mar. 15, 2011.

Office communication corresponding to European Patent Application 01 957 376.5—2313 dated Jul. 16, 2012.

Office communication corresponding to European Patent Application 04 777 327.0—2313 dated Jul. 16, 2012.

Office communication corresponding to Israeli Patent Application No. 172926 dated Oct. 20, 2010.

Office communication corresponding to Israeli Patent Application No. 154266 dated Aug. 29, 2012.

Decision to Grant a European Patent corresponding to European Patent Application No. 01957376.5-1656/1307230 dated Sep. 26, 2013.

Intent to Grant corresponding to European Patent Application No. 04 777 327.0—1656 dated Jul. 22, 2013.

Intent to Grant corresponding to European Patent Application No. 01 957 376.5 dated May 31, 2013.

International Preliminary Report on Patentability and the Written Opinion corresponding to PCT International patent application No. PCT/US2004/021051 dated Jan. 12, 2006.

\* cited by examiner

Day 20 of incubation

Day3

ENHANCEMENT OF DEVELOPMENT OF OVIPAROUS SPECIES BY IN OVO FEEDING OF ENTERIC MODULATORS

RELATED APPLICATIONS

This application is a continuation-in-part of U.S. application Ser. No. 09/919,386, filed Jul. 31, 2001, which claims the benefit of U.S. Provisional Application No. 60/222,744, filed Aug. 3, 2000. The disclosures of these applications are incorporated by reference herein in their entireties.

FIELD OF THE INVENTION

The present invention relates to methods for enhancing the development and growth of oviparous species such as birds, reptiles and fish by the in ovo administration of nutrients, enteric modulators, or both.

Table of Abbreviations

| | |
|---|---|
| HMB | beta-hydroxy-beta-methylbutyrate |
| IO | in ovo feeding |
| LAP | leucine amino peptidase |
| mm | millimeters |
| mOsm | milliosmoles |
| P | P-value |
| $R^2$ | predictability |
| SD | standard deviation |

BACKGROUND OF THE INVENTION

The source of nutrients to a post-hatch bird changes as the embryonic yolk is replaced with an exogenous diet. The hatchling must switch from a yolk nutrient-based diet (mainly fats) to a solid feed diet (mainly carbohydrates and proteins). Birds hatch with an immature gastrointestinal tract—indeed, with the yolk sac still attached. After hatch, the gastrointestinal tract undergoes rapid morphological, biochemical and cellular development in order to assimilate ingested nutrients. Since the intestine is instrumental in supplying the precursors for growth, its development plays an important role in the animal's ultimate ability to grow, gain weight, utilize dietary nutrients, and resist enteric disease pathogens.

All oviparous species hatch with an underdeveloped capacity to digest dietary constituents; accordingly, hatchling growth and enteric disease resistance are greatly suppressed. Post-hatch development of this digestive capacity is facilitated by exposure of enteric tissue to dietary constituents, but is often compromised by various environmental factors that act upon the hatchling. It is desirable to enhance the digestive capacity of the animal before hatch, because there are few environmental factors that can compromise enteric development during incubation. Moreover, because shorter incubation time and weak hatchlings are observed in a number of situations (e.g., when eggs are produced by young hens), there remains a need for new ways to stimulate the enteric development and growth of birds after hatch.

Examples of substances which have been introduced into embryonated poultry eggs via in ovo administration include live culture vaccines, antibiotics, vitamins, and competitive exclusion media. See generally, U.S. Pat. No. 6,244,214 to Hebrank. Specific examples of treatment substances are described in U.S. Pat. No. 4,458,630 to Sharma et al., and U.S. Pat. No. 5,028,421 to Fredericksen et al. See also, U.S. Pat. No. 4,458,630 to Sharma et al., U.S. Pat. No. 4,681,063 to Hebrank, and U.S. Pat. No. 5,158,038 to Sheeks et al. However, the introduction of treatment substances in ovo in order to enhance enteric development and overall growth of an animal has heretofore not been described.

SUMMARY OF THE INVENTION

In view of the foregoing, a first aspect of the subject matter described herein is a method of facilitating the growth of an oviparous animal such as a bird by feeding a nutrient composition to the animal in ovo. The nutrient composition is administered in an amount effective to facilitate the growth of the animal. In one embodiment, the growth of the animal is enhanced after hatch. In other embodiments, the growth of the animal is enhanced before hatch, while in still other embodiments the growth of the animal is enhanced before hatch and after hatch. The nutrient composition generally comprises at least one nutrient selected from the group consisting of carbohydrates, proteins, peptides, and amino acids. The nutrient composition may optionally include minerals, vitamins, and other nutriceuticals. In certain embodiments, the nutrient composition is administered in ovo into the amniotic fluid.

A second aspect of the subject matter described herein is a method of facilitating the growth of an oviparous animal such as a bird by feeding an enteric modulator to the animal in ovo. The enteric modulator is administered in an amount effective to facilitate the enteric development and/or the growth of the animal. In one embodiment, the enteric development and/or growth of the animal is enhanced after hatch. In other embodiments, the enteric development and/or growth of the animal is enhanced before hatch, while in still other embodiments the enteric development and/or growth of the animal is enhanced before hatch and after hatch. In certain embodiments, the enteric modulator is administered in ovo into the amniotic fluid. In a particular embodiment, the enteric modulator is beta-hydroxy-beta-methylbutyrate (HMB), or an edible salt thereof.

A third aspect of the subject matter described herein is a method of facilitating the growth of a bird, comprising concurrently administering to the bird in ovo (i) a nutrient composition and (ii) an enteric modulator. The nutrient composition and the enteric modulator are together administered in an amount effective to facilitate the enteric development and/or growth of the bird. In one embodiment, the nutrient composition and enteric modulator synergistically facilitate the growth of the bird. In one embodiment, the enteric development and/or growth of the animal is enhanced after hatch. In other embodiments, the enteric development and/or growth of the animal is enhanced before hatch, while in still other embodiments the enteric development and/or growth of the animal is enhanced before hatch and after hatch. The nutrient composition generally comprises at least one nutrient selected from the group consisting of carbohydrates, proteins, peptides, and amino acids. The nutrient composition may optionally include minerals, vitamins, and other nutriceuticals. In one embodiment, the nutrient composition and enteric modulator are administered by feeding.

A further aspect of the present invention is the use of a nutrient and the use of an enteric modulator (either separately or in combination) for the preparation of a composition for the in ovo feeding of an oviparous animal subject as described herein.

Accordingly, an object of the present invention is to provide a method of facilitating the enteric development and/or growth of oviparous animals such as birds, including both food and non-food animals such as endangered species, before and/or after hatch.

An object of the invention having been stated hereinabove, and which is addressed in whole or in part by the present invention, other objects will become evident as the description proceeds when taken in connection with the accompanying drawings as best described hereinbelow.

DETAILED DESCRIPTION OF PREFERRED EMBODIMENTS

Figure 1:
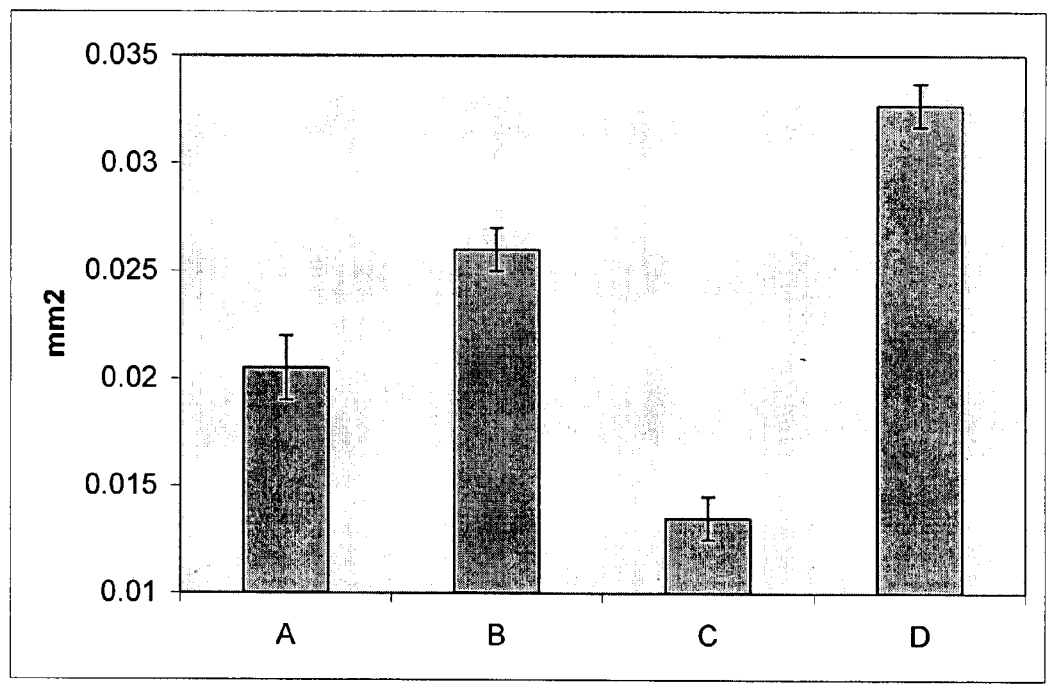
FIG. 1 is a bar graph illustrating the effect of in ovo feeding of carbohydrates (A), carbohydrates with HMB (B), HMB alone (D), and non-injected controls (C) on jejunal villi surface area ($mm^2$) of broilers at 20 days of incubation (1 day before hatch). Each histogram bar represents the average±SD of 10 examined birds.

All patents and publications referred to in this application are herein expressly incorporated by reference in their entirety.

Animals that may be treated by the methods of the present invention are, in general, non-mammalian oviparous species such as birds, or cold-blooded animals such as reptiles, amphibians, and fish. In certain embodiments, the methods described herein are used to treat birds. Any species of bird may be treated by the methods described herein, including but not limited to birds used as food such as chickens, turkeys, ducks, geese, quail, pheasant, and ostrich. In other embodiments, the methods described herein may also be used in conjunction with the raising of endangered species such as whooping cranes to assist in efforts to preserve those species.

As used herein, the term "in ovo feeding," or "IO" refers to the administration of compounds into the embryonic amnion, which is subsequently consumed by the embryo by oral means and thus comes into contact with tissues of the digestive tract. The term "in ovo feeding" is used to describe the methods described herein because the hatchling orally consumes the amnionic fluid prior to hatching. Thus, administration of nutrients or enteric modulators into the embryonic amnion is fundamentally feeding the embryo an external diet prior to hatching.

As utilized in the methods described herein, in ovo feeding involves the administration into the embryonic amnion a solution or suspension of nutrients, optionally together or separately with other compounds that modulate enteric development, in order to improve the hatchling's nutritional status during the transition from embryonic nutrition to diet digestive competence. Optimal nutritional status during this critical period is crucial for the development of the digestive, skeletal, muscular, and immune systems, and helps to normalize homeostatic hormone status and sustain balanced metabolism.

One aspect of the methods described herein is the in ovo delivery of nutrients and enteric modulators into the amnion of the embryo during the last quarter of embryonic development. This methodology is advantageous because the amnion is orally swallowed by the embryo. Consequently, the in ovo administered feeding solution/suspension is ingested by the embryo and is presented to enteric tissues, such as enterocytes and other cells of the gut mucosal membrane.

In certain embodiments, the in ovo feeding techniques described herein serve to enhance the enteric development of late term embryos and hatchlings, and improve the body weights (and preferably the survival rates and disease resistance) of hatchlings, both before and at the time of hatch, and for a period of time after hatch (e.g., two or three weeks).

The term "concurrently administering," as used herein, refers to the administration of two separate compounds or compositions in close temporal proximity to one another (for example, simultaneously or sequentially). Concurrent administration may optionally be carried out by administering the two compounds or compositions together in a common carrier (e.g., by adding an enteric modulator to a food composition, or combining a nutrient composition with an enteric modulator in a suitable carrier).

The term "synergistically," as used herein, means that the combined effect of two separate active agents (e.g., a nutrient composition and an enteric modulator) is greater than that which would be expected from the sum effect of the two agents were they to be administered separately.

As used herein, the term "growth" generally refers to at least one of the following effects: enhanced or increased weight gain after hatch or before hatch, larger hatchlings at time of hatch, improved efficiency of feed (food) utilization after hatch, reduced days to market (consumption) size (i.e., a predetermined size), and the like, all as compared to animals that have not received in ovo administration of the nutrient composition and/or enteric modulator.

The term "nutrient," as used herein, refers to essential nutrient compounds that are necessary for the growth of an animal to which they are fed. Nutrients include (a) proteins and protein fragments (e.g., peptides and amino acids such as lysine), (b) carbohydrates (e.g., sugars including monosaccharides, starches, dextrin, dextrose, oligosaccharides and polysaccharides), (c) lipids, and other compounds recognized as nutrients in the art.

The term "nutrient composition" refers to a food composition comprising at least one nutrient. In certain embodiments, a nutrient composition contains one or both of (a) at least one protein or protein fragment and (b) at least one carbohydrate. Nutrient compositions may optionally include minerals, vitamins, and short peptides, which are known in the art.

The total caloric composition of the nutrient composition will vary with the particular species being treated, but will typically range from about one-tenth, one, five, or ten calories to about twenty, forty, 100 or 200 calories, or more. For chickens and turkeys, the total caloric composition of the nutrient composition will generally range from about one-half or one to about twenty or forty calories. Since the average caloric content of a chicken egg is about seventy calories, the in ovo feeding solution may supplement an additional one-half percent or one percent to about ten percent of the calories of the total egg.

The nutrient composition may be administered in any form, including liquid form, solid form, and combinations thereof. Examples of suitable forms include but are not limited to solutions, emulsions, suspensions, mixtures, and the like. In one embodiment, the nutrient composition includes at least one protein, peptide or amino acid, and may alternatively or additional include at least one carbohydrate (e.g., a monosaccharide or polysaccharide). In a general embodiment, the nutrient composition contains at least one carbohydrate. In one particular embodiment, at least about one tenth of the total calories are contributed from monosaccharides and/or polysaccharides, and/or protein, and/or amino acids in the composition.

An "enteric modulator," as used herein, refers to a compound that stimulates the development and/or metabolism of a cell of the digestive system, such cells including but not limited to enterocytes, goblet cells, intestinal lymphocytes, etc. Examples of suitable enteric modulators include, but are not limited to, beta-hydroxy-beta-methylbutyrate (HMB) and the edible salts thereof, organic zinc complexes (e.g., Zn-amino acid complex, Zn-proteinate, and Zn-chelates with a carbohydrate or protein or organic acid), lectins (e.g., Concanavolin A, poke weed mitogen, wheat gluten antigen, bean lectins, and lectins from microbial sources), glutamine or glutamate, arginine, carnitine, creatine, vitamins A, D, or E, betaine, choline, lethicin, S-adenosylmethionine, tyrosine and its metabolic derivatives (e.g. dopamine, norepinephrine, epinephrine), tryptophan and its metabolic derivatives (e.g. serotonin, melatonin), glucosamine, fatty acid derivatives (e.g., omega-3 fatty acids, conjugated linoleic acid, and prostaglandins), and antioxidants (e.g., bioflavinoids, ascorbic acid, rutin, butylated hydroxytoluene (BHT), ethoxyquin, vitamins, pyrroliquinoline, quinone and its derivatives, and carotenoids).

Beta-hydroxy-beta-methylbutyrate (HMB), which term as used herein includes the edible salts thereof, is known and described in, among other references, U.S. Pat. No. 5,028,440 to Nissen. Edible HMB salts include but are not limited to Ca-HMB.

Enteric modulators such as HMB may be administered to eggs in any suitable amount. For chicken and turkey eggs, suitable amounts may range from about 0.01, 0.05 or 0.1 milligrams per egg to about 1, 2, 3 or 5 milligrams per egg. Enteric modulators may be administered in liquid or solid solution. In this embodiment, the amount of enteric modulator administered to the animal may be expressed as a percentage of the solution administered, which percentage may range from about 0.01%, 0.02%, 0.05%, or 0.1% enteric modulator to about 1.0%, 2.0%, 5.0% or 10.0% enteric modulator.

In certain embodiments, an enteric modulator and a nutrient composition may be administered concurrently to an animal. In such an embodiment, the enteric modulator may be administered as a separate formulation from the nutrient composition formulation. In another embodiment, the enteric modulator may comprise part of the nutrient composition formulation that is administered to the animal. In yet other embodiments, an enteric modulator and a nutrient composition may be combined together in a carrier prior to administration.

In one embodiment, the osmotic pressure of the composition or formulation administered to the animal is no greater than about 800 millisomoles (mOsm), and in particular embodiments the osmotic pressure of the composition or formulation is from about 50, 100, 200 or 300 milliosmoles to about 600 or 700 milliosmoles.

As noted above, the present invention may be practiced with any type of egg, including chicken, turkey, duck, goose, quail, pheasant, and ostrich eggs. Chicken and turkey eggs (including meat-type chicken eggs) are utilized in one embodiment of the invention. Eggs treated by the methods of the invention are fertile eggs, which in certain embodiments are in the fourth quarter of incubation. Chicken eggs may be treated on about the fifteenth to nineteenth day of incubation, and in certain embodiments are treated on about the seventeenth or eighteenth day of incubation. Turkey eggs may be treated on about the twentieth to twenty sixth day of incubation, and in certain embodiments are treated on about the twenty-second, twenty-third, or twenty-fourth day of incubation.

The site of injection or administration of the nutrient composition and/or enteric modulator may be in the air cell or in the region defined by the amnion, including the amniotic fluid, the yolk sac or the embryo itself. For feeding of the nutrient composition and/or enteric modulator to the subject in ovo, the nutrient composition may be administered into the amniotic fluid, which can then be orally ingested by the bird. Alternatively, the nutrient composition and/or enteric modulator may be administered into the air cell, where the composition can be orally ingested upon internal piping (or by diffusion across the air cell membrane). In yet another embodiment, the nutrient composition and/or enteric modulator may be administered by direct injection into the yolk sac. Thus, in one embodiment the nutrient composition is deposited in the amniotic fluid; in another embodiment the enteric modulator is deposited in the air cell. The location of administration of the nutrient composition and/or enteric modulator may be the same or different. For example, the nutrient composition may be administered into the amniotic fluid and an enteric modulator into the air sac, and vice versa. In one embodiment, an enteric modulator and nutrient composition are administered together into the same location, such as the amniotic fluid.

The particular mechanism of administration is not critical to the practice of the methods described herein, but it is desirable that the method of administration not unduly damage the tissues and organs of the embryo such that the treatment will not significantly decrease hatchability and/or hatch rate. A syringe fitted with a needle of about number 22 or number 23 gauge is suitable for the purpose, although other size needles and other delivery methods are also useful. For injection into the amniotic fluid, the needle is inserted into the egg. A pilot hole may optionally be punched or drilled through the shell prior to insertion of the needle to prevent damaging or dulling of the needle. If desired, the egg can be sealed with a sealing material such as wax or the like after injection to prevent subsequent entry of undesirable bacteria.

High-speed, automated injection systems for avian embryos are particularly suitable for practicing the present invention. Exemplary high-speed, automated injection systems include but are not limited to those disclosed in U.S. Pat. Nos. 4,040,388 and 4,469,047 to Miller, and U.S. Pat. No. 4,593,646 to Miller and Sheeks. Other systems useful in the practice of the methods described herein are described in U.S. Pat. Nos. 4,903,635 and 4,681,063, both to Hebrank. Useful injection systems are commercially available from Embrex Inc., Research Triangle Park, N.C., USA.

After administration of the nutrient composition and/or enteric modulator, eggs are incubated to hatch. The live animals are then fed a suitable feed composition and grown as desired, typically for at least a period of one to two weeks, depending upon the particular species and the end-use of the species. Enhanced growth after hatch resulting from the administration of the nutrient composition and/or enteric modulator is observed in the overall population of animals produced. Enhanced growth before hatch resulting from the administration of the nutrient composition and/or enteric modulator may also be observed in the overall population of animals produced.

As noted above, one aspect of technology described herein involves compositions for the in ovo feeding of an animal subject as described herein, and the use of such compositions. Such compositions may be prepared by combining one or more nutrients as described above, in the amounts described above, and/or by combining an enteric modulator as described herein, in a suitable carrier for administration. In one embodiment, the carrier is suitable for injection administration. In a particular embodiment, the composition an emulsion suitable for injection into the yolk sac. Suitable carriers include but are not limited to water and saline solutions. The compositions will generally have the osmotic pressures described above. In one embodiment of the invention, the compositions are sterile. The compositions may be prepared in unit dosage form or in batch form for injection with a suitable injection apparatus, as described herein.

The following non-limiting Examples have been included to illustrate preferred modes of the invention. Certain aspects of the following Examples are described in terms of techniques and procedures found or contemplated by the present inventors to work well in the practice of the invention. These Examples are exemplified through the use of standard laboratory practices of the inventors. In light of the present disclosure and the general level of skill in the art, those of skill will appreciate that the following Examples are intended to be exemplary only and that numerous changes, modifications and alterations can be employed without departing from the spirit and scope of the invention.

EXPERIMENTAL METHODS AND MATERIALS FOR EXAMPLES 1-4: IN OVO FEEDING OF BROILERS WITH THE ENTERIC MODULATOR HMB

Hatching broiler chicken eggs from a commercial Ross breeding flock at 39-40 weeks of age were incubated according to standard hatchery practices and conditions. At 18 days of incubation, eggs containing viable embryos were weighed and divided into four treatment groups of 100 eggs each. Average egg weight was 55 grams and the treatment groups were assigned eggs with similar weight frequency distribution. Each group of 100 eggs was then injected with one of four in ovo feed treatment solutions (1 ml per egg) with a 23-gage needle into the amnion. The four in ovo treatments included the following: A) 20% dextrin+3% maltose in 0.5% NaCl saline solution; B) 20% dextrin+3% maltose+0.1% Ca-HMB in 0.5% NaCl saline; C) Non-injected control; and D) 0.1% Ca-HMB in 0.5% NaCl saline. Ca-HMB was obtained from Metabolic Technologies, Inc., Ames, Iowa, USA. After injection, all the eggs were placed in hatching baskets such that each treatment was equally represented in each location of the incubator.

Ten eggs per treatment group were sampled at 19 and 20 days of incubation, at hatch, and at 4 days post-hatch to determine liver glycogen concentration, and jejunal villus surface area. Relative breast muscle size was determined on 10 birds per treatment group at day of hatch and 10 days of age. Body weights (approximately 70 birds per treatment group) were determined at hatch and 10 days of age.

Example 1

Effect of an Enteric Modulator on Broiler Body Weight

The results of the above-described in ovo treatments on body weights are presented in Table 1.

TABLE 1

The effect of in ovo feeding of carbohydrates (A), carbohydrates with HMB (B), HMB alone (D), and non-injected controls (C) on body weight of broilers at hatch and 10 days post-hatch[1].

| Experimental Treatment | Hatch (1 day of age) (Grams ± SD Body Weight per Broiler Chick) | 10 days of age |
|---|---|---|
| A (Carbohydrate IO solution) | 46.98 ± 0.3 [a] (3.3%)[2] | 248.9 ± 3.2 [b] (0.9%) |
| B (Carbohydrate + HMB IO solution) | 46.94 ± 0.2 [a] (3.2%) | 254.5 ± 2.4 [a] (3.2%) |
| C (Non-injected control) | 45.49 ± 0.3 [b] (0%) | 246.7 ± 3.7 [b] (0%) |
| D (HMB IO solution) | 46.5 ± 0.3 [a] (2.2%) | 249.7 ± 3.9 [b] (1.2%) |

[1]Each mean represents an average of about 70 chicks per treatment group.
[2]Percentage increase relative to controls in parenthesis.
[a,b] Means within a column with different letter superscripts are significantly different (P < .05).

All three in ovo feeding treatments significantly (P<0.05) increased body weights at hatch by 3% over the control treatment. By 10 days of age, all the in ovo feed treatments still had heavier body weights, but only the in ovo feed treatment containing HMB and the carbohydrates (treatment B) significantly (P<0.05) heavier body weight by 4.8% over the controls. These results demonstrate that the enteric modulator HMB augmented and helped sustain the effect of carbohydrate in ovo feeding solution through to 10 days post-hatch.

Example 2

Effect of an Enteric Modulator on Broiler Breast Muscle Weight

In addition to positive effects on body weight, in ovo feeding also significantly improved breast muscle weight relative to body weight (Table 2). At hatch, in ovo feeding of HMB alone increased relative breast muscle size (percentage of body weight) by 15.1% over the control treatment group. Although in ovo feeding the carbohydrate solution increased breast muscle size at hatch by only 3.6% over controls, the addition of HMB to the carbohydrate in ovo solution augmented the effect of over 7.3%. By 10 days of age, all the in ovo feeding treatments significantly increased relative breast muscle size in comparison to the control treatment. There were no significant differences among the in ovo feeding treatments at 10 days of age.

The economic value of broilers is largely associated with the yield of breast meat. Breast meat yield potential is established during the last phase of embryonic development and the first few days after hatch. Any increase in breast yield observed during the first 10 days after hatch can be carried through to market age. These results indicate that in ovo feeding enhances early muscle development, especially if the in ovo feeding solution contains HMB.

TABLE 2

The effect of in ovo (IO) feeding of carbohydrates (A), carbohydrates with HMB (B), HMB alone (D), and non-injected controls (C) on relative breast muscle weight of broilers at hatch and 10 days post-hatch[1].

| Experimental Treatment | Hatch (1 day of age) (Breast muscle weight ± SD expressed as % of Body Weight) | 10 days of age |
|---|---|---|
| A (Carbohydrate IO solution | 1.99% ± .09 $^a$ (3.6%) | 12.2% ± .3 $^b$ (8.0%) |
| B (Carbohydrate + HMB IO solution) | 2.06% ± .1 $^a$ (7.3%) | 12.0 ± .3 $^a$ (6.2%) |
| C (Non-injected control) | 1.92% ± .06 $^b$ (0%) | 11.3 ± .2 $^b$ (0%) |
| D (HMB IO solution) | 2.21% ± .07 $^a$ (15.1%) | 11.9% ± .2 $^b$ (5.5%) |

[1]Each mean represents an average of about 70 chicks per treatment group.
[2]Percentage increase relative to controls in parenthesis.
$^{a,b}$ Means within a column with different letter superscripts are significantly different (P < .05).

Example 3

Effect of an Enteric Modulator on Enteric Absorptive Surface Area

Figure 2:
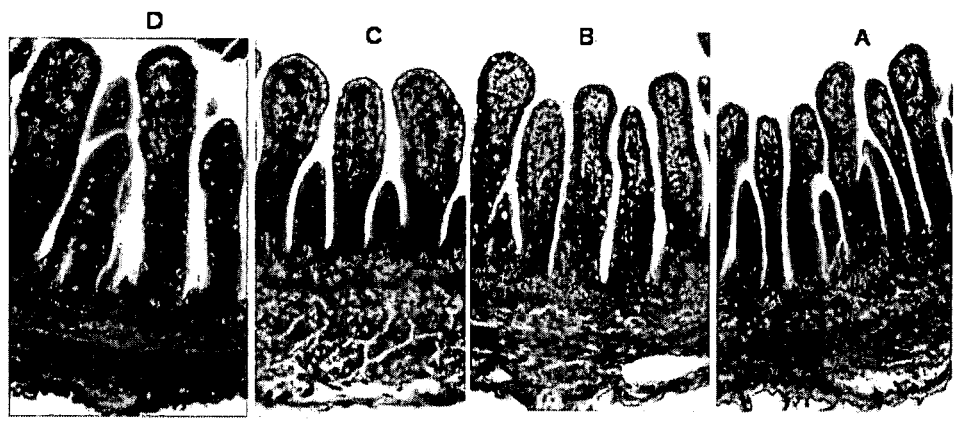
FIG. 2 is a photograph illustrating the histological effect of in ovo feeding of carbohydrates (A), carbohydrates with HMB (B), HMB alone (D), and non-injected controls (C) on histological observations of the jejunum section in the embryonic intestine at day 20 of incubation (1 day prior to hatch). Panels D and B (HMB treatments) illustrate more developed villi structures than panels C and A.

Many of the positive effects of the in ovo feeding treatments on body weight and early muscle development are associated with the enhancement of enteric development and the capacity to absorb nutrients. The capacity to absorb nutrients is directly proportional to absorptive surface area. Two days post in ovo feeding (20 days of incubation), the in ovo feeding treatments significantly increased the surface area of intestinal (jejunum) villi (FIG. 1). In ovo feeding of the carbohydrate solution (treatment A) increased villi surface area by 50% over controls, whereas in ovo feeding of HMB alone resulted in over 140% greater villi surface area than controls. Moreover, HMB significantly enhanced the positive effect of in ovo feeding the carbohydrate solution. Histological observations made at 20 days of incubation also reveals remarkable treatment effects of in ovo feeding (FIG. 2). In the control treatment (panel C), villi were observed to be in two distinct stages of development: half of the villi were small emerging villi buds, while the other half were more larger developed villi structures. Additionally, the mucosal structures under the villi are much less developed and organized as observed in the in ovo fed treatment groups.

In 20-day embryos that received the carbohydrate in ovo feeding solution (treatment A), average villi size was greater than controls, but two developmental villi phases were still evident. In contrast, embryos that received the HMB (treatments B and D) clearly had larger villi structures and few if any small emerging villi buds as observed in treatment C and A embryos. The villi surface area measurements and histological observations clearly indicate that in ovo feeding enhanced enteric development and the absorptive surface area, especially by the inclusion of HMB. These observations illustrate that HMB enhances or accelerates enteric development when administered in ovo into the embryonic amnion.

Figure 3:
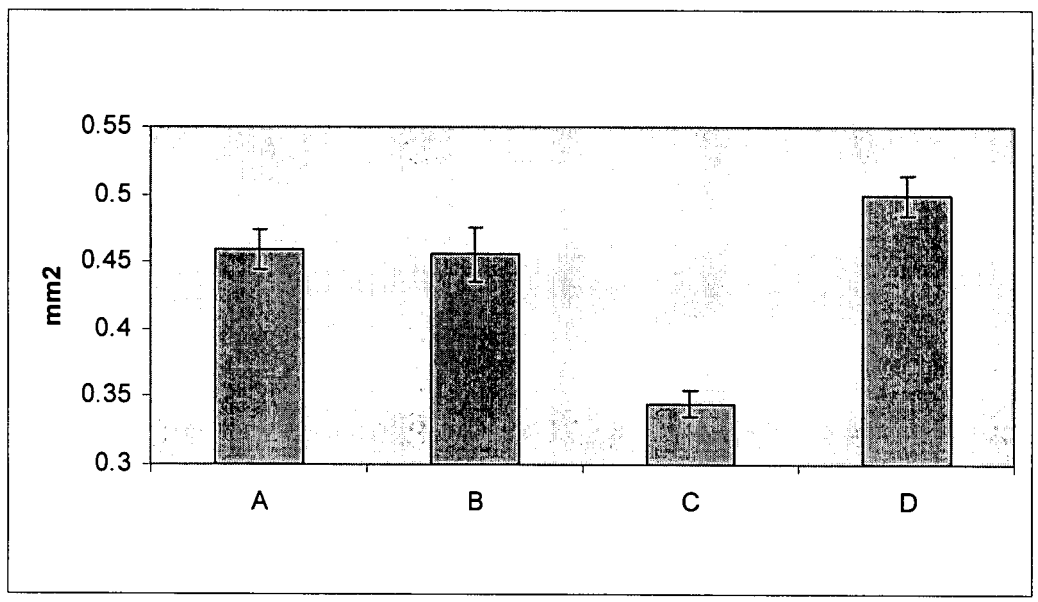
FIG. 3 is a bar graph illustrating the effect of in ovo feeding of carbohydrates (A), carbohydrates with HMB (B), HMB alone (D), and non-injected controls (C) on jejunal villi surface area ($mm^2$) of broilers at 4 days post hatch. Each histogram bar represents the average±SD of 10 examined birds.

At 4 days after hatch, chicks that received the in ovo feeding treatments continued to exhibit significantly greater surface area of jejunal villi (FIG. 3). The chicks that were in ovo fed the HMB alone (Treatment D) had 40% greater surface area of the their jejunal villi than the control chicks, indicating that benefit of in ovo feeding of HMB persisted through the critical first few days post-hatch. Although the carbohydrate in ovo feeding solution (treatment A) increased villi surface area by about 30% over controls at 4 days post-hatch, the addition of HMB to the carbohydrate in ovo solution (treatment B) did not result in any observable benefit.

Figure 4:
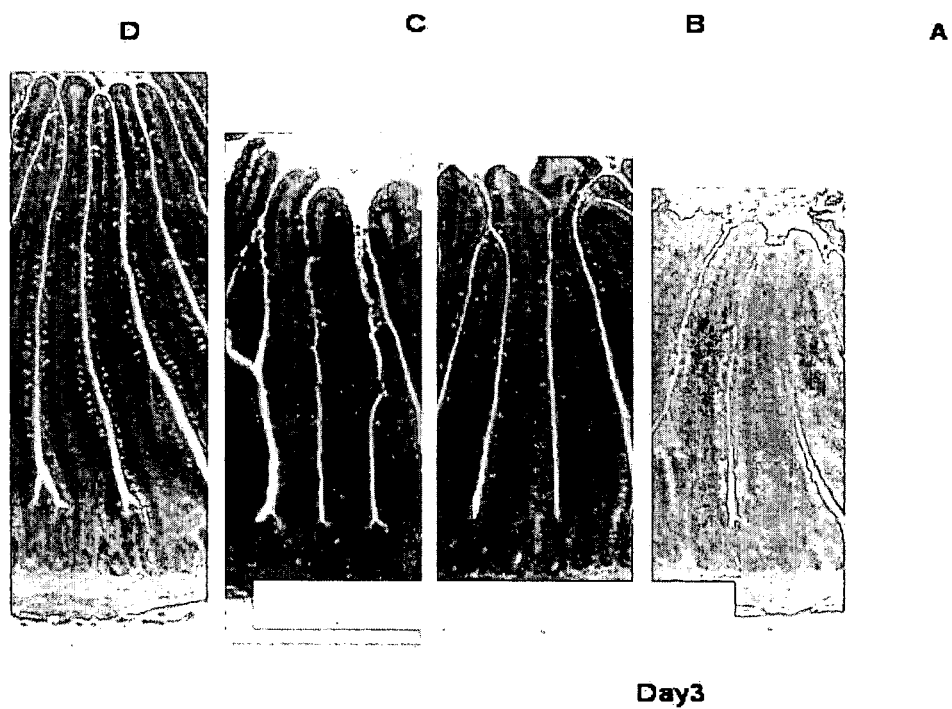
FIG. 4 is a photograph illustrating the histological effect of in ovo feeding of carbohydrates (A), carbohydrates with HMB (B), HMB alone (D), and non-injected controls (C) on histological observations of the jejunum section in the embryonic intestine at 4 days post hatch. Panels D and B (HMB treatments) illustrate more developed villi structures than panels C and A.

Histological observations made at 4 days post-hatch also revealed that the HMB in ovo-fed birds had enhanced villi length and uniformity, in comparison to the carbohydrate treatment and controls (FIG. 4). In FIG. 4, panels D and B (HMB treatments) illustrate more developed villi structures than panels C and A.

Example 4

Effect of an Enteric Modulator on Broiler Liver Glycogen Level

Liver glycogen content is an indicator of energy status of the young chick. Glycogen is the primary energy supply needed to fuel the hatching process and to sustain the chick until normal feed intake is established. High liver glycogen content, particularly just prior to and immediately after hatch, is an indication of good energy status necessary to fuel early development.

Figure 5:
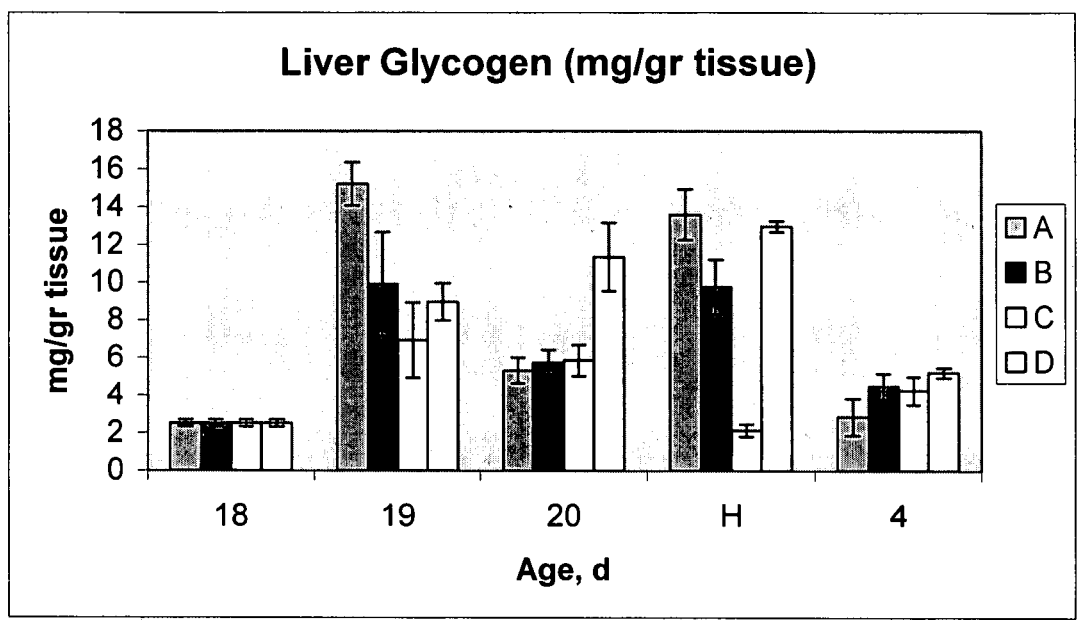
FIG. 5 is a bar graph illustrating the effect of in ovo feeding of carbohydrates (A), carbohydrates with HMB (B), HMB alone (D), and non-injected controls (C) on glycogen content per gram of liver tissue of broilers at 18, 19, 20 days of incubation, hatch, and 4 days of age. Each histogram bar represents the average±SD of 10 examined birds.

FIG. 5 illustrates that the effect of in ovo feeding treatments on liver glycogen content differs depending upon the age of the embryo or chick. As expected, there were no treatment effects on liver glycogen content at 18 days of incubation, because this was before the in ovo treatments were administered. At 19 days of incubation (24 hours after in ovo feeding), embryos fed the carbohydrate solution alone in ovo (treatment 1) had significantly higher liver glycogen content than the embryos fed according to the other treatments. By 20 days of incubation, the embryos fed HMB alone in ovo (treatment D) had significantly increased liver glycogen content, which persisted through hatch and 4 days post-hatch. At hatch, all the in ovo feeding treatments had increased liver glycogen by up to 6 fold over the control treatment.

Example 5

Effect of Enteric Modulator and Protein In Ovo on Broilers Hatched from Young Hens Examples 1-4 illustrated the positive effects of in ovo feeding HMB on early growth and development of chicks, whether or not the in ovo feeding solution contained carbohydrates. In this Example, HMB was added as an enteric modulator in all the in ovo feeding solutions containing protein, carbohydrate, or both, as follows:

Hatching broiler chicken eggs from a commercial Ross breeding flock at 30 weeks of age were incubated according to standard hatchery practices and conditions. At 18 days of incubation, eggs containing viable embryos were weighed and divided into four treatment groups of 100 eggs each. Average egg weight was 48 grams and the treatment groups were assigned eggs with similar weight frequency distribution. Each group of 100 eggs was then injected with one of four in ovo feed treatment solutions (1 ml per egg) with a 23-gage needle into the amnion. The four in ovo treatments included the following: P) 0.1% Ca-HMB+24% egg white protein in 0.5% NaCl saline solution; PS) 0.1% Ca-HMB+8% egg white protein+12% dextrin+6% maltose in 0.5% NaCl saline; C) Non-injected control; and S) 0.1% Ca-HMB+12% dextrin+6% maltose in 0.5% NaCl saline. After all the eggs were injected, they were placed in hatching baskets such that each treatment was equally represented in each location of the incubator. Body weights (approximately 70 birds per treatment group) were determined at hatch, 10, and 28 days of age.

The in ovo feeding solution containing carbohydrate+HMB (treatment S) significantly increased body weight at hatch by 3% over the control treatment, and this effect persisted until the birds were 28 days of age (Table 3). Similar to slightly better body weights were observed in chicks fed HMB in ovo along with the combination of protein and carbohydrates (treatment PS). However, the in ovo feeding of protein and HMB together did not significantly increase body weights at hatch and subsequently, as was described in Example 1.

TABLE 3

The effect of in ovo feeding of Protein + HMB (P), Protein + carbohydrates + HMB (PS), and carbohydrates + HMB (S) in comparison to and non-injected controls (C) on body weight of broilers at hatch, and 10, and 28 days post-hatch.[1]

| In ovo Treatment | Hatch | 10 Days of Age | 28 Days of Age |
|---|---|---|---|
| | (Grams ± SD Body Weight per Broiler Chick) | | |
| P (Protein + HMB) | 39.5 ± 0.3 [b] (+1.2%) | 160 ± 3 [b] (−1.2%) | 950 ± 14 [b] (+0.7%) |
| PS (Protein + carbohydrates + HMB) | 40.2 ± 0.3 [a] (+3.1%) | 170 ± 3 [a] (+4.9%) | 982 ± 14 [a] (+4.1%) |
| S (carbohydrates + HMB) | 40.3 ± 0.3 [a] (+3.3%) | 168 ± 3 [a] (+3.7%) | 973 ± 10 [a] (+3.1%) |
| C (Control) | 39.0 ± 0.4 [b] (0%) | 162 ± 3 [b] (0%) | 943 ± 10 [b] (0%) |

[1]Each mean represents an average of about 70 chicks per treatment group.
[2]Percentage increase relative to controls in parenthesis.
[a,b] Means within a column with different letter superscripts are significantly different ($P < .05$).

The primary difference between the results presented in Example 1 and the present example is the age of the breeder flocks that produced the hatching eggs. In the present Example, the eggs used were smaller and from younger hens than those eggs used in the experiment presented in Example 1. Although not intending to be bound to any particular theory of the invention, embryos from young breeder hens have less in ovo resources and may respond more to protein and carbohydrates than embryos from older hens. The body weight data presented in this Example demonstrates that HMB helps maintain the positive effect of in ovo feeding of carbohydrate through to 28 days of age, with or without the inclusion of protein.

EXPERIMENTAL METHODS AND MATERIALS FOR EXAMPLES 6-9: IN OVO FEEDING OF ENTERIC MODULATOR FEEDING IN TURKEYS

Hatching turkey eggs from a commercial Hybrid breeding flock at 35 weeks of age were incubated according to standard hatchery practices and conditions. At 23 days of incubation, eggs containing viable embryos were weighed and divided into four treatment groups of 100 eggs each. Average egg weight was 75 grams. The treatment groups were assigned eggs with similar weight frequency distribution. Each group of 100 eggs was then injected with one of four in ovo feed treatment solutions (2 ml per egg) with a 22-gage needle into the amnion. The five in ovo treatments included the following: A) 18% egg white protein in 0.4% NaCl saline solution; B) 18% egg white protein+0.1% Ca-HMB in 0.4% NaCl saline; C) Non-injected control; D) 0.1% Ca-HMB in 0.4% NaCl saline solution, and S) 20% dextrin+3% maltose in 0.4% NaCl saline. After all the eggs were injected, they were then placed in hatching baskets such that each treatment was equally represented in each location of the incubator. Body weights (approximately 70 birds per treatment group) were determined at hatch, 3, and 7 days of age. Ten eggs per treatment group were sampled at 1 and 7 days post-hatch to determine relative breast muscle weight, the total amount of glycogen in liver and breast muscle, and activity of leucine amino peptidase (LAP) and maltase per gram of intestine.

Example 6

Effect of Enteric Modulator On Turkey Body Weight

The effect of the different in ovo feeding solution treatments on body weight and early growth are presented in Table 4.

TABLE 4

The effect of in ovo feeding of Protein (A), protein + HMB (B), HMB (D), and carbohydrates (S) in comparison to and non-injected controls (C) on body weight of turkeys at 1, 3, and 7 days post-hatch[1].

| In ovo Treatment | Hatch (1 day of age) | 3 Days of Age | 7 Days of Age |
|---|---|---|---|
| | (Grams ± SD Body Weight per Turkey poult) | | |
| A (Protein) | 56.02 ± .48 [a] (+6.4%)[2] | 73.23 ± 1.5 [b] (−0.5%) | 134.9 ± 3.69 [c] (−0.4%) |
| B (Protein + HMB) | 54.09 ± 0.4 [b] (+3.0%) | 76.63 ± 1.4 [a] (+4.1%) | 140.9 ± 3.02 [ab] (+4.0%) |
| C (Control) | 52.62 ± 0.4 [c] (0%) | 73.64 ± 1.07 [b] (0%) | 135.5 ± 2.53 [bc] (0%) |
| D (HMB) | 54.46 ± 0.42 [b] (+3.5%) | 75.84 ± 1.05 [a] (+3.0%) | 145.7 ± 1.95 [a] (+7.5%) |
| S (Carbohydrates) | 56.65 ± 0.56 [a] (+7.6%) | 74.98 ± 1.01 [a] (+1.8%) | 139.2 ± 2.86 [b] (+2.7%) |

[1]Each mean represents an average of about 70 poults per treatment group.
[2]Percentage increase relative to controls in parenthesis.
[a,b,c] Means within a column with different letter superscripts are significantly different ($P < .05$).

In comparison to the control treatment, all the in ovo feeding solutions significantly ($P<0.05$) increased body weight at hatch. The heaviest body weights at hatch were observed among the poults that received either the carbohydrate or protein in ovo feeding solution. In ovo feeding of HMB alone produced a positive response in hatchling weight, but reduced the positive effect of in ovo feeding protein, likely because energy was the limiting factor in promoting early growth. Although both protein and carbohydrate had the greatest effect on body weight at hatch, their effects did not persist through to 3 and 7 days of age. In contrast, poults that receive HMB either alone or in combination with protein not only retained their advantage in body weight over the controls, but this advantage increased as the birds grew older. Because HMB acts to enhance enteric development during early development, the poults were able to utilize dietary nutrients more effectively to fuel more aggressive growth during the first week after hatch.

Example 7

Effect of Enteric Modulator on Turkey Breast Weight

The effect from in ovo feeding on early growth is largely associated with an increase in breast muscle size at hatch and 7 days of age. Poults in ovo fed the protein solution alone had 22% greater muscle weight than controls at hatch, but this advantage did not persist through to 7 days of age (Table 5). Likewise, the 10% advantage in breast muscle size at hatch observed among poults fed the carbohydrate solution in ovo did not persist through to 7 days of age. At hatch, poults in ovo fed HMB had significantly higher (14%) breast muscle weight in comparison to the controls, but this HMB effect was not observed when it was fed in combination with protein in ovo. This apparent negative interaction effect of HMB with protein at hatch is likely associated with a limitation of caloric energy to drive protein assimilation. However, poults that were fed the HMB alone or in combination with protein in ovo had 8.6% and 6.5% greater muscle weight at 7 days of age, respectively. These data demonstrate the HMB can be an important factor in stimulating and sustaining early growth of critical tissues.

TABLE 5

The effect of in ovo feeding of Protein (A), protein + HMB (B), HMB (D), and carbohydrates (S) in comparison to and non-injected controls (C) on Breast Muscle Weight expressed as a percentage of body weight of turkeys at 1 and 7 days post-hatch[1]

| In ovo Treatment | Hatch (1 Day of age) | 7 Days of Age |
|---|---|---|
|  | Breast Muscle Weight (% of Body Weight) | |
| A (Protein) | 3.3 ± 0.5 $^a$ (+22.2%)[2] | 9.2 ± 0.3 $^b$ (−1.1%) |
| B (Protein + HMB) | 2.8 ± 0.3 $^a$ (+3.7%) | 9.8 ± 0.3 $^a$ (+5.4%) |
| C (Control) | 2.7 ± 0.3 $^b$ (0%) | 9.3 ± 0.3 $^b$ (0%) |
| D (HMB) | 3.1 ± 0.3 $^a$ (+14.8%) | 10.0 ± 0.3 $^a$ (+7.5%) |
| S (Carbohydrates) | 3.0 ± 0.3 $^a$ (+11.1%) | 9.2 ± 0.3 $^b$ (−1.1%) |

[1]Each mean represents an average of about 10 chicks per treatment group.
[2]Percentage increase relative to controls in parenthesis.
$^{a,b}$ Means within a column with different letter superscripts are significantly different (P < .05).

Example 8

Effect of Enteric Modulator on Turkey Glycogen Levels

Glycogen content in liver and muscle are indicators of the status of the metabolically available energy status of the hatchling. As total glycogen reserves rise, the ability of the hatchling to sustain periods of stress is enhanced and the bird is more likely to survive distressful events. At hatch, in ovo feeding of protein resulted in the greatest total glycogen content in the liver, indicating that in ovo feeding of protein may indeed stimulate gluconeogenesis (Table 6). In contrast, in ovo feeding of carbohydrate may inhibit gluconeogenesis, even though the extra calories in ovo fed may be converted into glycogen. In ovo feeding of HMB also significantly increased total liver glycogen content at hatch, but this positive effect was lost when HMB is in ovo fed in combination with protein because energy was too limiting to take full benefit of the protein and/or HMB. However, by 7 days of age, the combination of HMB and protein in ovo feeding resulted in the highest total liver glycogen content, likely because sufficient calories were garnered from dietary sources. Likewise, in ovo feeding of either protein or carbohydrate alone resulted in better energy status at 7 days of age as indicated by total liver glycogen.

TABLE 6

The effect of in ovo feeding of Protein (A), protein + HMB (B), HMB (D), and carbohydrates (S) in comparison to and non-injected controls (C) on total liver glycogen content of turkeys at 1 and 7 days post-hatch[1]

| In ovo Treatment | Hatch (1 Day of age) | 7 Days of Age |
|---|---|---|
|  | Total Liver Glycogen (mg/liver) | |
| A (Protein) | 52.5 ± 10.80 $^a$ (+158.6%)[2] | 590 ± 101.13 $^a$ (56.1%) |
| B (Protein + HMB) | 28.3 ± 5.76 $^b$ (+39.4%) | 684 ± 122.6 $^a$ (+80.9%) |
| C (Control) | 20.3 ± 6.52 $^b$ (0%) | 378 ± 92.8 $^b$ (0%) |
| D (HMB) | 32.5 ± 4.19 $^a$ (+60.1%) | 297 ± 111.8 $^b$ (−21.4%) |
| S (Carbohydrates) | 26.2 ± 4.2 $^b$ (+29.1%) | 593 ± 116 $^a$ (+56.9%) |

[1]Each mean represents an average of about 10 chicks per treatment group.
[2]Percentage increase relative to controls in parenthesis.
$^{a,b}$ Means within a column with different letter superscripts are significantly different (P < .05).

The effect of in ovo feeding on muscle glycogen of turkey poults is presented in Table 7. Muscle glycogen is among the first carbohydrate reserves depleted during the hatching process and first few days post-hatch. Indeed, muscle glycogen and muscle protein reserves may be utilized to build liver glycogen reserves to prepare for a stress event that frequently occurs in the neonatal animal. Consequently, depressed muscle glycogen is often associated with elevated liver glycogen. Even though in ovo feeding of protein alone increased total liver glycogen, it came at the expense on a significant decrease in muscle glycogen at hatch. HMB was able to improve the muscle glycogen level in the protein in ovo-fed poults, although it was still significantly lower than controls. In contrast, in ovo feeding HMB alone resulted in a >25% increase in muscle glycogen content over controls. Therefore, HMB increased the total glycogen content in both the liver and breast muscle, and this positive effect persisted in the muscle through to 7 days of age. In ovo feeding of carbohydrates also increased muscle glycogen at hatch, and this effect persisted until the birds were 7 days of age.

TABLE 7

The effect of in ovo feeding of Protein (A), protein + HMB (B), HMB (D), and carbohydrates (S) in comparison to and non-injected controls (C) on total breast muscle glycogen content of turkeys at 1 and 7 days post-hatch[1]

| In ovo Treatment | Hatch (1 Day of age) | 7 Days of Age |
|---|---|---|
|  | Total Breast Muscle Glycogen (mg/liver) | |
| A (Protein) | 16.9 ± 3.66 $^a$ (−69.9%)[2] | 470 ± 22.9 $^a$ (−32.1%) |
| B (Protein + HMB) | 36.5 ± 5.8 $^c$ (−34.9%) | 546 ± 30.5 $^b$ (−21.2%) |
| C (Control) | 56.1 ± 1.42 $^b$ (0%) | 693 ± 26.7 $^b$ (0%) |
| D (HMB) | 70.3 ± 3.04 $^a$ (+25.3%) | 791 ± 20.3 $^a$ (+14.1%) |
| S (Carbohydrates) | 60.8 ± 2.7 $^a$ (+8.4%) | 780 ± 45.4 $^a$ (+12.5%) |

[1]Each mean represents an average of about 10 chicks per treatment group.
[2]Percentage increase relative to controls in parenthesis.
$^{a,b,c,d}$ Means within a column with different letter superscripts are significantly different (P < .05).

Example 9

Effect of Enteric Modulator on Turkey Maltase and LAP Activity

Maltase and leucine amino peptidase (LAP) are enteric brush boarder enzymes involved in the terminal digestion of carbohydrates and proteins before the simple monosaccharides and amino acids and dipeptides are transported across the enterocyte membranes. Tables 8 and 9 present data that demonstrate the effects of the different in ovo feeding solutions on maltase and LAP activities.

HMB was found to have no significant effect on these digestive enzymes, indicating that HMB's effect is strictly associated with modulating the growth and development of intestinal tissue rather than protein or carbohydrate digestion. Relative to the controls, in ovo feeding of protein evidently reduced maltase activity (an indicator of carbohydrate digestion), whereas in ovo feeding of carbohydrate increased maltase activity at hatch and 7 days of age (Table 8).

In contrast, LAP activity at hatch was significantly reduced by in ovo feeding of protein, but this effect was reversed when HMB was included in the protein-based in ovo feeding solution. By 7 days of age, LAP activity was significantly increased by in ovo feeding of protein, and even more so by in ovo feeding of carbohydrate. Protein and carbohydrate enzyme activity is apparently most influenced by in ovo feeding substrates rather than by enteric growth modulators such as HMB.

TABLE 8

The effect of in ovo feeding of Protein (A), protein + HMB (B), HMB (D), and carbohydrates (S) in comparison to and non-injected controls (C) on enteric brush boarder maltase activity of turkeys at 1 and 7 days post-hatch[1]

| In ovo Treatment | Hatch (1 Day of age) | 7 Days of Age |
|---|---|---|
| | micromole maltase activity/hr/g enteric tissue | |
| A (Protein) | 365 ± 19.6 [b] (−14.1%)[2] | 297 ± 79 [b] (−15.1%) |
| B (Protein + HMB) | 454 ± 34.0 [a] (+6.8%) | 312 ± 26 [b] (−10.8%) |
| C (Control) | 425 ± 50.7 [a,b] (0%) | 350 ± 38 [a,b] (0%) |
| D (HMB) | 433 ± 17.6 [a] (+1.9%) | 360 ± 59 [a,b] (+2.9%) |
| S (Carbohydrates) | 441 ± 31.0 [a] (+3.8%) | 518 ± 39 [a] (+48.0%) |

[1]Each mean represents an average of about 10 chicks per treatment group.
[2]Percentage increase relative to controls in parenthesis.
[a,b] Means within a column with different letter superscripts are significantly different ($P < .05$).

TABLE 9

The effect of in ovo feeding of Protein (A), protein + HMB (B), HMB (D), and carbohydrates (S) in comparison to and non-injected controls (C) on enteric brush boarder leucine amino peptidase (LAP) activity of turkeys at 1 and 7 days post-hatch[1]

| In ovo Treatment | Hatch (1 Day of age) | 7 Days of Age |
|---|---|---|
| | Units LAP activity/min/g enteric tissue | |
| A (Protein) | 65.7 ± 5.4 [c] (−44.0%)[2] | 46.3 ± 5.4 [b] (+12.9%) |
| B (Protein + HMB) | 115.9 ± 13.1 [a] (+4.5%) | 46.8 ± 5.3 [b] (+14.1%) |
| C (Control) | 110.9 ± 25 [b] (0%) | 41.0 ± 4.5 [c] (0%) |
| D (HMB) | 101.3 ± 8.9 [b] (−8.9%) | 39.0 ± 9.8 [c] (−4.8%) |
| S (Carbohydrates) | 92.2 ± 10.4 [b] (−18.7%) | 93.3 ± 13.7 [a] (+127.6%) |

[1]Each mean represents an average of about 10 chicks per treatment group.
[2]Percentage increase relative to controls in parenthesis.
[a,b] Means within a column with different letter superscripts are significantly different ($P < .05$).

Example 10

Effect of Dosage of Enteric Modulator in Turkeys

Three hundred commercial turkey eggs were stored for three weeks in a cooler at 55° F. and then placed in an egg incubator. After 24 days of incubation, eggs identified as fertile by candling the eggs were randomly assigned to 5 groups of 50 eggs. Each group of 50 eggs was then injected into the air cell at a depth of 0.25 inches with a 0.10 ml saline (0.89% NaCl) solution containing 0, 0.1, 1.0, 10.0, and 100.0 milligrams of Ca-HMB.

After injection, the eggs were placed in hatching baskets such that each treatment was equally represented in each location of the incubator. Hatched poults were recovered from the incubator at 28 days of incubation and the number of hatched poults per treatment group recorded. The hatched poults were then sacrificed and blood glucose was determined in accordance with known techniques (see Donaldson and Christensen, *Comp. Biochem. Physiol.* 98A, 347-350 (1991)). Livers were removed and glycogen content of each liver was determined by known techniques (see Dreiling et al., *Meat Sci.* 20, 167-177 (1987)).

Figure 6:
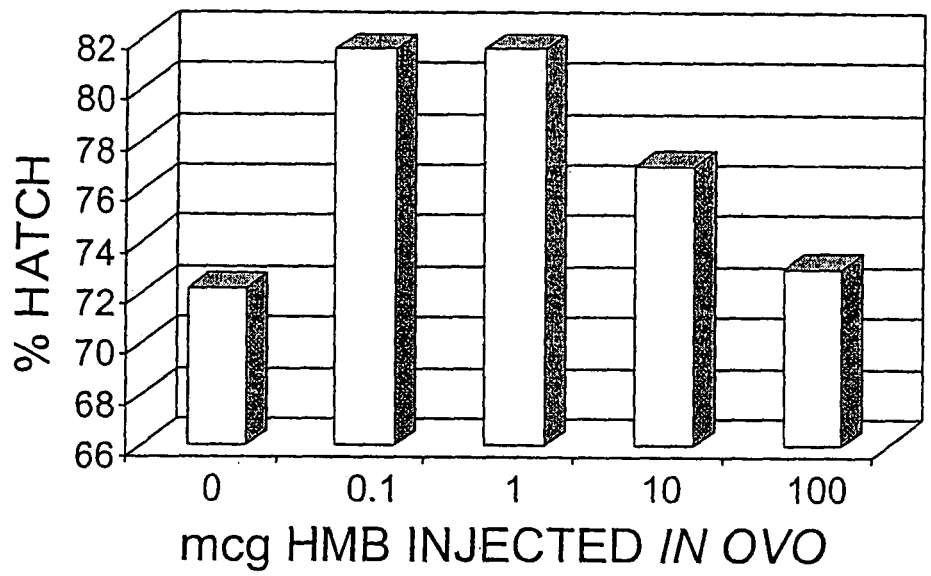
FIG. 6 is a bar graph illustrating the effect of the amount of HMB injected in ovo (milligrams HMB in 0.1 ml saline solution) at 24 days of incubation on the hatchability rate (percent hatch) of commercial turkey poults.

FIG. 6 illustrates the effect of the amount of HMB injected into the eggs of 24-day-old turkey embryos. Hatch rate of the control treatment (0 milligrams HMB) was characteristically low for late season layed turkey eggs subjected to 3 weeks storage prior to setting in the incubator. However, when 0.1 and 1.0 milligrams of HMB was injected into the eggs at 24 days of incubation, hatchability rate increased from 72.3% to 81.6%. As the level of HMB injected increased above 1.0 milligrams, hatchability rate decreased. There was a significant quadratic dose response ($P<0.05$) as the level of HMB injected in ovo increased.

Figure 7:
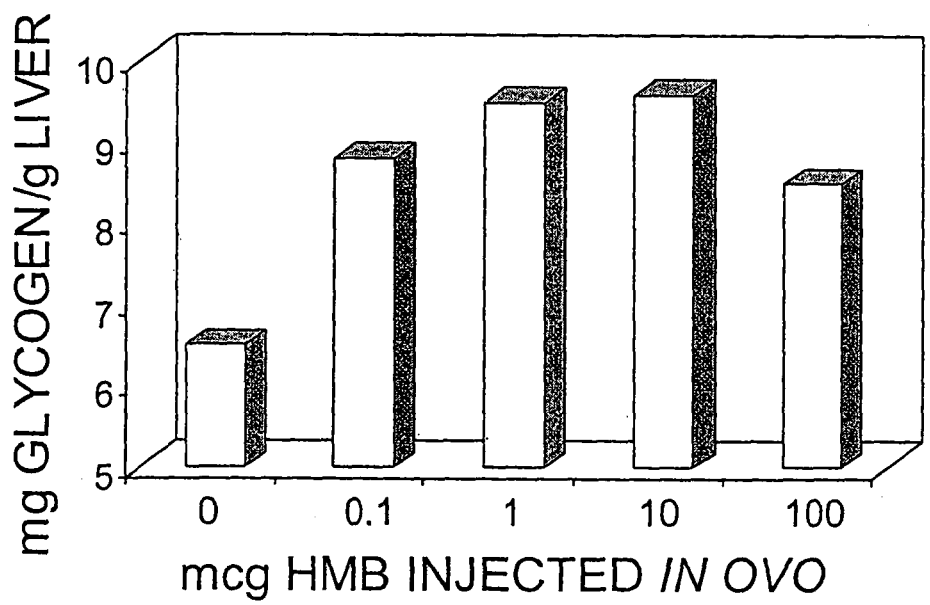
FIG. 7 is a bar graph illustrating the effect of the amount of HMB injected in ovo (milligrams HMB in 0.1 ml saline solution) at 24 days of incubation on the liver glycogen concentration of commercial turkey poults.

The effect of HMB dosage injected in ovo on liver glycogen content in turkey poults is illustrated by FIG. 7. Liver glycogen content was increased by about 40% in all HMB dosage levels as compared with the control treatment. There was a significant quadratic dose response ($P<0.5$) as the level of HMB injected in ovo increased. Hatchability rate has previously been positively correlated with liver glycogen content of turkey and chick embryos before hatch.

Figure 8:
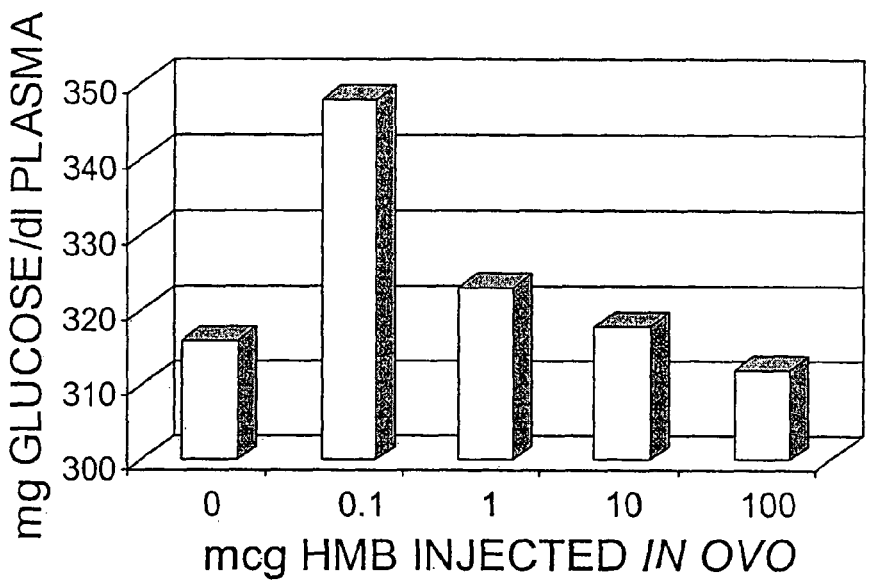
FIG. 8 is a bar graph illustrating the effect of the amount of HMB injected in ovo (milligrams HMB in 0.1 ml saline solution) at 24 days of incubation on the plasma glucose concentration of commercial turkey poults.

FIG. 8 illustrates that only the 0.1 milligram HMB dosage resulted in a significantly increased plasma glucose concentration. The other HMB dosage levels had no significant effect on plasma glucose as compared with the control treatment. These results indicate that the 0.1 milligram dosage level of HMB may not be the lowest functional dose to affect plasma glucose levels of poults.

In summary, in ovo injection of 0.1 to 1.0 milligrams of HMB into 24 day old turkey embryos significantly increases hatching rate, apparently due to an improvement in liver glycogen reserves.

Example 11

Importance of In Ovo Feed Solution Osmolarity on Chick Hatchability

Fertile broiler chicken hatching eggs were injected in ovo into the amnion with solutions of various degrees of osmolarity. Percent hatch of fertile eggs were recorded. The results are given in FIG. 9.

Figure 9:
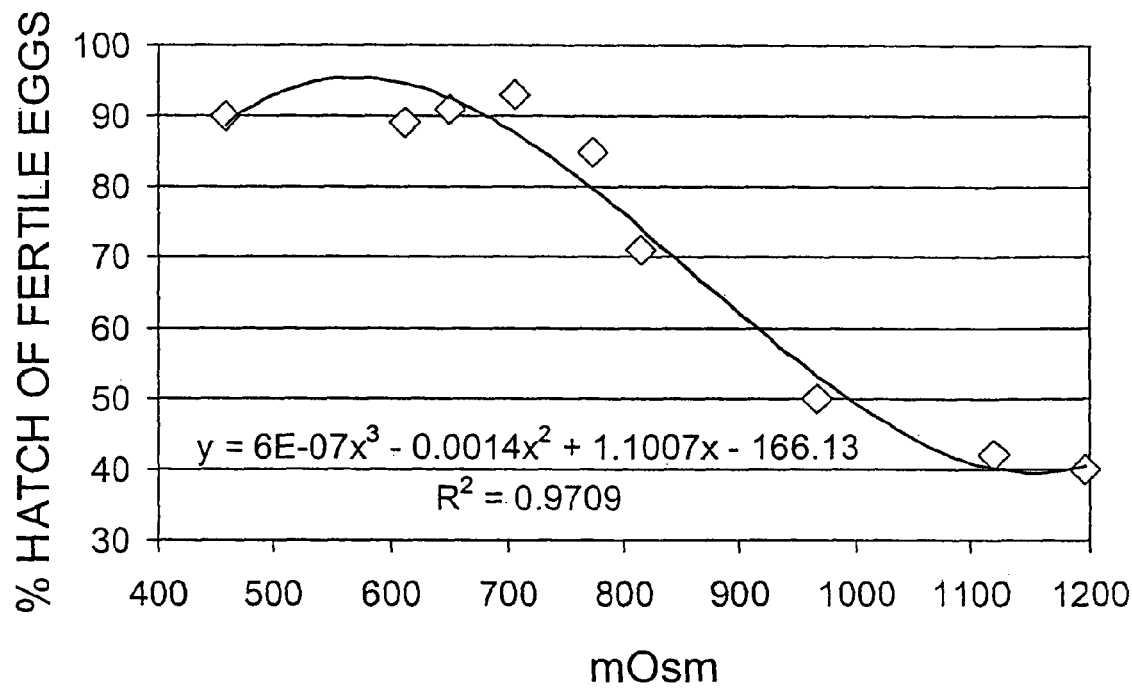
FIG. 9 is a graph illustrating the effect of in ovo feeding solution osmolarity (mOsm) on hatchability of chicks.

FIG. 9 illustrates the importance on the osmolarity of the in ovo feeding solution on hatchability of chicks. Acceptable hatchability of chicks was observed when eggs were injected with solutions having an osmolarity ranging below 800 mOsm with an optimum hatchability observed at about 400 to 600 mOsm. Unacceptable hatching rates were observed when the in ovo feeding solution exceeded 800 mOsm. The effect of in ovo feed solution osmolarity on hatchability is highly predictable by a mathematical model ($R^2=0.97$).

It will be understood that various details of the invention can be changed without departing from the scope of the invention. Furthermore, the foregoing description is for the purpose of illustration only, and not for the purpose of limitation, the invention being defined by the claims appended hereto.

That which is claimed is:

1. A method of facilitating the growth of a bird, comprising:
   (a) providing an enteric modulator capable of stimulating the development and/or metabolism of enteric tissue of the digestive system;
   (b) administering to a bird in ovo said enteric modulator in an amount effective to stimulate the development and/or metabolism of enteric tissue of the digestive system, wherein the enteric modulator is administered in an amount between about 0.1 milligrams and 1.0 milligrams per bird, wherein the enteric modulator is administered in a composition comprising the enteric modulator and an edible carrier, wherein the osmotic pressure of the composition is not greater than 800 milliosmoles, wherein the enteric modulator is HMB or Ca-HMB, wherein said administering step is carried out during the last quarter of in ovo incubation, wherein the bird is a chicken or turkey; and
   (c) stimulating the development and/or metabolism of enteric tissue of the digestive system of the bird as compared to a bird not administered an enteric modulator in ovo, whereby stimulating the development and/or metabolism of enteric tissue of the digestive system facilitates growth of the bird as compared to a bird not administered an enteric modulator in ovo.

2. A method of facilitating the growth of a bird, comprising:
   (a) providing an enteric modulator capable of stimulating the development and/or metabolism of enteric tissue of the digestive system;
   (b) administering to a bird in ovo said enteric modulator in an amount effective to stimulate the development and/or metabolism of enteric tissue of the digestive system, wherein the enteric modulator is administered in an amount between about 0.1 milligrams and 1.0 milligrams per bird, wherein the enteric modulator is administered in a composition comprising the enteric modulator and an edible carrier, wherein the osmotic pressure of the composition is not greater than 800 milliosmoles, wherein said enteric modulator is a Zn-amino acid complex, Zn-proteinate, Zn-chelate with a carbohydrate, or Zn-chelate with a protein, wherein said administering step is carried out during the last quarter of in ovo incubation, wherein the bird is a chicken or turkey; and
   (c) stimulating the development and/or metabolism of enteric tissue of the digestive system of the bird as compared to a bird not administered an enteric modulator in ovo, whereby stimulating the development and/or metabolism of enteric tissue of the digestive system facilitates growth of the bird as compared to a bird not administered an enteric modulator in ovo, wherein stimulating the development and/or metabolism of enteric tissue of the digestive system comprises increased digestive capacity of the enteric tissue, increased surface area of the enteric tissue, increased absorptive capacity of the enteric tissue, increased villi surface area, increased brush border enzyme activity, and combinations thereof.

3. A method of facilitating the growth of a bird, comprising:
   (a) providing an enteric modulator capable of stimulating the development and/or metabolism of enteric tissue of the digestive system;
   (b) administering to a bird in ovo an enteric modulator in an amount effective to stimulate the development and/or metabolism of enteric tissue of the digestive system, wherein the enteric modulator is administered in an amount between about 0.1 milligrams and 1.0 milligrams per bird, wherein the enteric modulator is administered in a composition comprising the enteric modulator and an edible carrier, wherein the osmotic pressure of the composition is not greater than 800 milliosmoles, wherein said enteric modulator is a lectin, wherein said administering step is carried out during the last quarter of in ovo incubation, wherein the bird is a chicken or turkey; and
   (c) stimulating the development and/or metabolism of enteric tissue of the digestive system of the bird as compared to a bird not administered an enteric modulator in ovo, whereby stimulating the development and/or metabolism of enteric tissue of the digestive system facilitates growth of the bird as compared to a bird not administered an enteric modulator in ovo, wherein stimulating the development and/or metabolism of enteric tissue of the digestive system comprises increased digestive capacity of the enteric tissue, increased surface area of the enteric tissue, increased absorptive capacity of the enteric tissue, increased villi surface area, increased brush border enzyme activity, and combinations thereof.

* * * * *